March 15, 1960     C. J. SCHILLING     2,928,278
LIQUID LEVEL GAUGE
Filed May 29, 1957
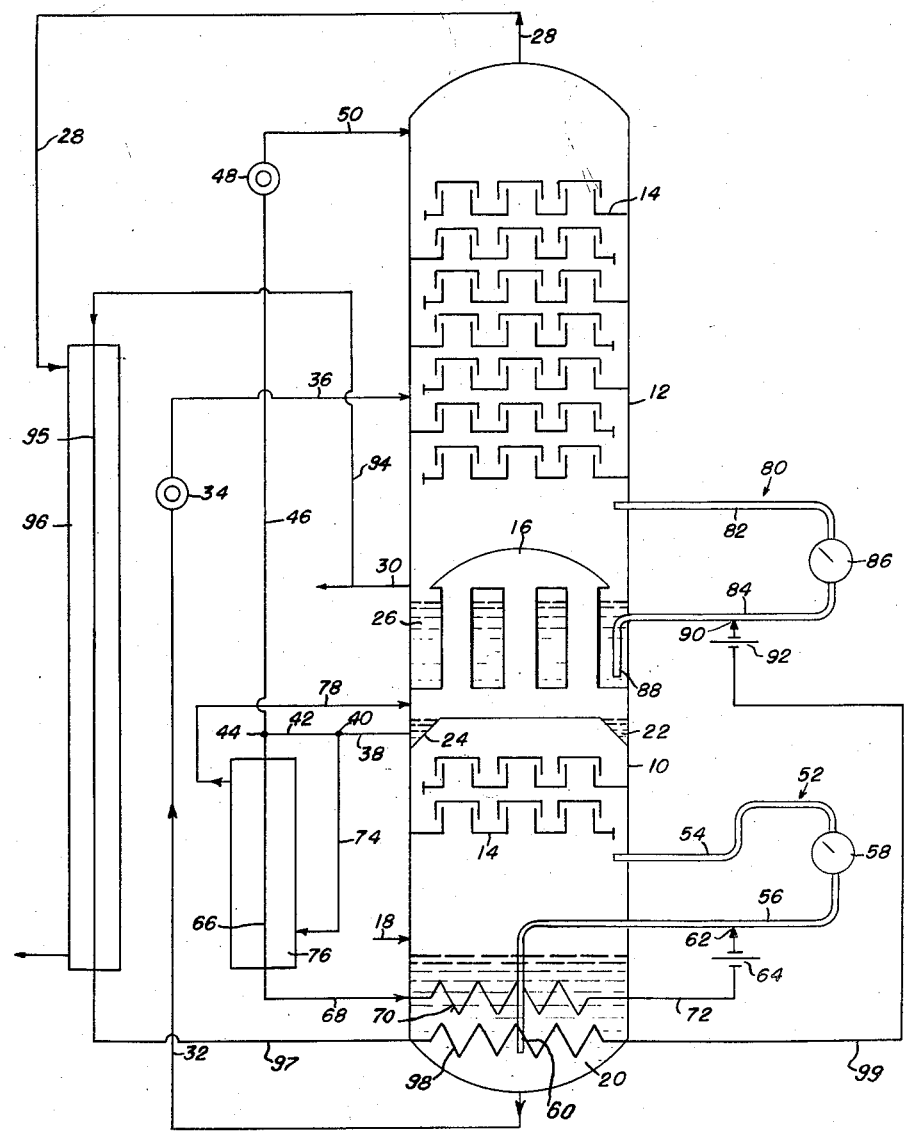
INVENTOR
*CLARENCE J. SCHILLING*
BY *Shanley & O'Neil*
ATTORNEY

United States Patent Office 2,928,278
Patented Mar. 15, 1960

2,928,278

LIQUID LEVEL GAUGE

Clarence J. Schilling, Allentown, Pa., assignor to Air Products Incorporated, a corporation of Michigan Application May 29, 1957, Serial No. 662,393

10 Claims. (Cl. 73—302)

This invention relates to improvements in apparatus for the determination of the depth of a relatively inaccessible body of liquid, and more particularly to apparatus for determining the depth of a body of liquid such as a body of liquid which collects during the course of a fractionation operation. The invention has particular utility in connection with the indication of liquid levels in bodies of liquids in which are admixed solid impurities as in the separation of components of gaseous mixtures by low temperature liquefaction and fractionation, and will be illustrated by way of example in connection with the liquefaction and fractionation of air for the removal of oxygen and nitrogen components therefrom.

In a great many industrial processes involving the flow of liquids and in which the collection of bodies of liquids at one or more points in the process cycle forms a part of the process, the depth of the bodies of liquids provides a fairly accurate indication of the condition or balance of the operation. Various methods are known for the determination of these depths, most of these methods relying on some visual indication such as the height of the liquid on a scale or in a sight glass, or the height of a float, etc. However, when the liquid is in a continuous state of agitation, as for example are the boiling liquids that collect in fractionating operations, there is no discrete liquid level and visual indications of liquid depth are quite imprecise.

Therefore, it is common practice to determine the depth of agitated liquids by measuring the pressure at some reference level therein, the pressure giving an indication of the height of liquid head above the reference level. This is often done by establishing communication with the body of liquid through a conduit opening through a wall of the liquid container below the liquid line and measuring the pressure of the liquid in the conduit at a predetermined level below the liquid line. In such practice serious difficulties often arise in connection with maintaining such measuring devices in operative condition when the liquid to be measured is at or near its boiling point and particularly when it contains relatively high boiling impurities and in addition is at or near its boiling point, as in a fractionation operation. The high boiling impurities are those which are in solid phase at the temperature of the body of liquid, and these impurities present a problem in that they tend to accumulate in the conduit filled with test liquid and eventually to block that conduit to the extent that accurate presssure testing is no longer possible. These difficulties are especially pronounced when the liquid is at or near its boiling point, as in a fractionation operation, as the liquid withdrawal conduit must extend downwardly from the point at which it communicates with the body of liquid to prevent accumulations of vapor in the conduit with resulting inaccuracy of test results. In such instances the downwardly extending conduits provide traps or pockets for the solid phase impurities and rapidly become plugged by those impurities. It is then necessary to clean the testing equipment as by defrosting before operation can be resumed.

For example, in the liquefaction and fractionation of air into nitrogen and oxygen components the above problems associated with high boiling impurities are present in connection with carbon dioxide and with hydrocarbons such as ethylene and acetylene and with other air impurities that solidify above the boiling point of the liquid in which they are found. The fractionation of air is ordinarily accomplished in a fractionating zone in the form of a liquid-vapor contact column in which downwardly flowing liquid and upwardly flowing vapor pass in initimate countercurrent relationship. In general the liquid collecting in the bottom of the zone is relatively oxygen rich and the gas passing from the top of the zone is substantially nitrogen; and it is in the liquid pool that the impurities collect in solid phase primarily in the form of a suspension of fine particles and perhaps to a slight extent dissolved. It is these solid particles that have in the past given rise to the above difficulties.

The present invention solves the above problems by making it impossible for the impurities to enter the fluid line whose pressure is indicative of the liquid depth. This is done by establishing a confined vertically extending column of gas with a liquid-gas interface between the body of liquid and the gas of the column at the lower end of the column. The pressure of the gas is equal to the pressure of the liquid at the level of the interface and the level of the interface is fixed by continuous introduction of gas into the column, which gas flow prevents the entry of liquid or impurity into the column. The introduced gas in excess of that necessary for this purpose escapes into the body of liquid at the lower end of the column. Assuming the ambient pressure above the liquid to be constant, the liquid pressure at the interface and hence the pressure of the gas is directly proportional to the height of liquid head above the interface. Therefore, the depth of the body of liquid is determinable by measurement of the pressure of the column of gas. As a refinement of this procedure, the difference between the pressure of the column of gas and the ambient pressure above the liquid may be measured, so as to avoid errors otherwise introduced by variations in ambient pressure above the liquid.

Other advantages and features of the present invention will appear more fully below from the following detailed description considered in conjunction with the accompanying drawing. It is to be expressly understood, however, that the drawing is designed for purposes of illustration only and not as a definition of the limits of the invention, reference for the latter purpose being had to the appended claims.

In the drawing, the single figure is a diagrammatic illustration of a gaseous mixture separating cycle embodying the principles of the present invention.

With more particular reference to the drawing, there is shown a two-stage air fractionating cycle embodying the principles of the present invention, comprising a fractionating zone including a high pressure column or section 10 and a low pressure column or section 12, each section having a plurality of bubble plates 14 or other conventional liquid-vapor contact means. The sections 10 and 12 comprise relatively high and low pressure fractionating zones, respectively. The high pressure section 10 and the low pressure section 12 are structurally joined together in a conventional manner and are separated by a downwardly draining reflux condenser 16.

A stream of compressed and cooled gaseous mixture such as air at a relatively high pressure, as for example 75 pounds per square inch gauge, and previously cooled to the point of incipient or partial liquefaction as by conventional methods of heat interchange with fractionation products, is introduced into high pressure section 10 through a conduit 18. The air feed mixture undergoes a preliminary fractionation in section 10, producing a crude oxygen liquid fraction collecting in a first body of liquid or pool 20 in the base of the section and a gaseous nitrogen fraction which flows upwardly and into the passageways of reflux condenser 16 and is liquefied by heat exchange with liquid oxygen product collecting in a second body of liquid or pool 26 in the base of low pressure section 12 and surrounding the reflux condenser. A portion of the liquefied nitrogen fraction flows downwardly into the high pressure section as liquid reflux therefor, while another portion collects in a second body of liquid or pool 22 formed by a trough 24 fixed to the inside wall of section 10.

The fractionation is completed in low pressure section 12 to provide a liquid oxygen product collecting in pool 26 at the base of section 12 and a gaseous nitrogen product collecting in the dome of section 12. The stream of gaseous nitrogen product is withdrawn from section 12 through a conduit 28 for further use. The oxygen product may be withdrawn in liquid phase, or it may be withdrawn in gaseous phase through a conduit 30 communicating with section 12 between the lowermost bubble plate 14 therein and the level of pool 26 and leading to storage or to heat interchange with the entering air.

A feed stream for the low pressure section is provided by withdrawing crude oxygen through conduit 32, expanding it through expansion valve 34 to cool it and to reduce its pressure substantially to the pressure of section 12, and then passing it through conduit 36 into section 12 at an intermediate level. A second feed stream for section 12 is provided by withdrawing liquid nitrogen from pool 22 and passing it through conduit 38 past point of division 40, through conduit 42, past point of division 44, through conduit 46 to expansion valve 48 by which it is let down to substantially the pressure of section 12 and cooled, through conduit 50 and into section 12 above the uppermost bubble plate 14 therein.

Means for measuring the depth of pool 20 are provided, in the form of a manometer indicated generally at 52. Manometer 52 has an upper vapor line or leg 54 and a lower liquid level line or leg 56, both of which legs are dead-ended at their ends remote from section 10 against a manometer gauge 58, which is a pressure sensitive device adapted, in the illustrated embodiment, to give an indication of the difference of pressure between legs 54 and 56 in terms of a liquid depth reading on the dial face of the gauge. Lower leg 56 has a vertically extending portion 60 which is downwardly open and which extends a substantial distance below the level of pool 20. Both legs are gas filled; and it should be particularly noted that leg 56 is gas filled down to the very lower end of portion 60 thereof so that a vertically extending column of gas is established in portion 60. Of course it will be understood that the purpose of disposing portion 60 vertically is to exclude therefrom liquid from pool 20 by virtue of the gas pressure and that for this purpose portion 60 need not by any means be precisely vertical. Therefore, the term "vertically extending" as used herein and in the appended claims is to be construed in the sense of proceeding from a lower level to an upper level, regardless of the inclination of any particular intermediate section. Moreover, in speaking of the "column" of gas established in portion 60, no limitation is to be implied to the effect that the column is necessarily straight or of any particular cross-sectional configuration or of uniform dimensions throughout its length.

For the purpose of excluding liquid and impurities from leg 56 and thereby preventing the accumulation of the impurities in solid phase in the column of gas in such quantity as would block off the column of gas, a relatively low boiling uncontaminated gas, that is, a gas boiling at a temperature not higher than the temperature of the liquid in pool 20, is introduced into the column at a location 62 spaced from the lower end of leg 56. The pressure of the introduced gas is metered through an orifice 64 to be somewhat greater than the pressure of the column of gas, which is to say that the gas is introduced at a pressure which is a little higher than the pressure impressed on the gas in leg 56 by the head of liquid in pool 20. However, the gas in leg 56 comprising the column of gas does not thereby assume the pressure of the introduced gas inasmuch as leg 56 is open at its lower end, with the result that gas in excess of that required to keep leg 56 free from liquid and impurities escapes from the lower end of portion 60 into the surrounding pool 20. In operation, gas is continuously introduced at location 62 whence it passes in a continuous stream down along the column of gas and bubbles out from the lower end of portion 60. Thus a gas-liquid interface is established at the very lowermost end of portion 60 between the lower end of the column of gas and the liquid of pool 20. Moreover, the quantity of introduced gas necessary to maintain this relationship is not great and hence only a relatively very small flow of gas will occur although this flow will be continuous. Therefore, the position of the interface is fixed and the pressure of the gas throughout leg 56 will be equal to the pressure head exerted by the liquid in pool 20 above this interface. Variations in the liquid level of pool 20 will be transferred to the column of gas as directly proportional variations in the pressure thereof and these will be read by gauge 58 in terms of variations in liquid depth. Thus the crude oxygen in pool 20 comprises a relatively low boiling material and the impurities in solid state therein comprise a relatively high boiling material mixed therein, and the method of and apparatus for determining the depth of pool 20 assures that there will be no accumulation of the relatively high boiling material in solid phase in the column of gas established in portion 60.

The introduced gas should boil at a temperature not higher than the liquid in pool 20, which is boiling, or be at a relatively high temperature, so that the introduced gas does not condense in leg 56. To this end, a portion of the nitrogen in high pressure section 10 is withdrawn in liquid phase from high pressure section 10 and is used to make up the introduced gas. Specifically, a portion of the liquefied nitrogen proceeds from point of division 44 to a vertical column 66 in which it establishes a vertical column of liquid nitrogen. The proportion of liquid nitrogen passing into column 66 from point of division 44 is relatively minor compared to that which passes up through conduit 46. The pressure in conduit 44 and at point of division 44 is roughly the same as the pressure in the vapor dome of section 10; and this pressure is lower than the pressure at the lowermost end of leg 56, not only by virtue of the pressure head imparted by pool 20 but also because the vapors rising through section 10 undergo a pressure drop across each bubble plate 14. However, as stated above, the pressure of the introduced gas should be somewhat higher even than the pressure at the lower end of portion 60. Therefore, the pressure of the nitrogen stream must be increased, and it has been found that this can be most conveniently done when the nitrogen is in liquid phase. It is for this reason that nitrogen in liquid phase is withdrawn to provide the introduced gas.

Moreover, it has been found that the necessary pressure may be imparted to the liquid phase nitrogen by establishing a pressure head of liquid nitrogen of a height sufficient to provide the required pressure increase. For this purpose, liquid nitrogen is established in a vertical column 66 of a height such as to provide the requisite pressure head at the bottom of the column, which may for example be at a pressure of one pound per square inch above the pressure impressed on the gas in leg 56 by the head of liquid in pool 20. Thereafter, liquid nitrogen is continuously withdrawn from the bottom of column 66 through conduit 68 and passed through coil 70 in heat exchange relationship with the relatively warmer crude oxygen in pool 20 at least partially to vaporize the liquid nitrogen. Coil 70 may be immersed in pool 20 or it may be wrapped around the base of section 10, or otherwise disposed in heat exchange relationship with pool 20. From coil 70, gaseous nitrogen is introduced into leg 56 as described above.

The liquid in column 66 is at or not much below its boiling point, and the entry of ambient heat into this column would give rise to bubbling. This bubbling would in effect render column 66 part gas and part liquid with a corresponding decrease of pressure head and with variations in the magnitude of the remaining pressure head. It has been found that column 66 can be maintained free from bubbles and at a uniformly high head of pressure by continuously passing a sleeve of liquid nitrogen thereabout. Accordingly, a portion of the liquid nitrogen stream in conduit 38 passes through point of division 40 through conduit 74 and into sleeve 76 which surrounds column 66, and leaves sleeve 76 through conduit 78 by which it is reintroduced into section 10 just above trough 24. The sleeve of liquid nitrogen and the vertical column of liquid nitrogen therein are not to be considered in heat exchange relationship with each other. Instead, the sleeve of liquid nitrogen flowing continuously about the column serves as a completely efficient insulation which continuously removes all the ambient heat that would otherwise reach column 66.

In the case of the low pressure section 12, means are provided for determining the depth of pool 26, comprising a manometer indicated generally at 80, similar to manometer 52, having an upper vapor line or leg 82 and a lower liquid line or leg 84, both of which are gas filled and dead-ended against manometer gauge 86 for the purpose before described.

It should be noted that upper legs 54 and 82 are for the purpose of avoiding inaccuracies arising from variations in pressure above the pool of liquid being measured for depth. If these pressure variations are relatively quite small, or if the ambient pressure is constant, or if for any other reason the variations in ambient pressure are not objectionable, then legs 54 and 82 may be eliminated entirely.

As before, lower leg 84 is gas-filled and terminates downwardly in a downwardly open vertically extending portion 88 whereby a vertically extending column of gas is established at least partially within pool 26. As in the high pressure section, a gas-liquid interface is maintained at the very lowest end of portion 88 and small quantities of relatively warm gas are introduced at a pressure a little greater than that of the interface, at a location 90 spaced from the lower end of leg 84, the introduced gas being metered through an orifice 92.

In the depth measuring apparatus occupying the upper portion of the drawing, however, the source of supply for introduced gas is somewhat different in that the make-up liquid for the introduced gas is obtained from the product gas. Specifically, a conduit 94 takes product oxygen gas from conduit 30 and conducts it to the tube 95 of a tube and shell heat exchanger 96 where this product gas is condensed against product nitrogen from conduit 28 which passes through the shell portion of the heat exchanger. In this manner, a leg of liquid is formed corresponding to that at 66 above described. This liquid is taken out through conduit 97 and vaporized in coil 98 which is submerged in the crude oxygen pool 20. The gas thus formed is passed through conduit 99 to metering orifice 92 and thence into leg 84. Since this gas is relatively hot compared to the boiling oxygen in pool 26, it does not condense in vertically extending portion 88 but is effective in purging this lower end of the manometer system.

There are thus provided by the present invention methods of and apparatus for determining the depth of a body of liquid comprising a mixture of at least one relatively low boiling material and at least one relatively high boiling material, and particularly adaptable to a fractionating operation for separating different boiling point components of gaseous mixtures, in which a body of liquid collects during the operation, and in which a body of fluid also collects during the operation. The method comprises the steps of establishing a confined vertically extending column of gas with a liquid-vapor interface between the body of liquid and the gas of the column at the lower end of the column, whereby the pressure of the column of gas is equal to the pressure of the body of liquid at the lower end of the column of gas; continuously introducing a relatively low boiling uncontaminated gas, that is, a gas which boils at a temperature not higher than the temperature of the body of liquid, or a relatively hot gas, at a pressure somewhat greater than the pressure of the column of gas, into the confined column of gas at a location removed from the lower end thereof, to cause the column of gas continuously to flow from the location of introduction of this gas to the lower end of the column of gas and to pass the lower end of the column of gas into the body of liquid; and measuring the pressure of the column of gas as an indication of the height to which the body of liquid extends above the lower end of the column of gas. As a refinement of this method, there is measured the difference between the pressure of the column of gas and the ambient pressure at a location outside of the body of liquid, such as above the liquid in a fractionation operation, to aid in determining the height to which the body of liquid extends above the lower end of the column of gas. Preferably, the introduced gas is obtained by heat exchange of a relatively low boiling liquid with the body of liquid, thereby to vaporize at least a portion of the relatively low boiling liquid. Preferably, in order to impress the desired pressure on the introduced gas, the introduced gas is at some stage of the operation in liquid phase and the required pressure is applied to this liquid phase at that stage of the operation. It is also preferred that the liquid phase be established as a column of such height that its head of pressure will supply the required pressure to the introduced vapor. A further preferred form includes the continuous passing of a sleeve of this same liquid phase about the column to insulate the latter against the entry of ambient heat, thereby to maintain the column in liquid phase and to preserve its pressure head intact. It will also be understood that the material from which the introduced gas is obtained, in a fractionating operation, may be initially withdrawn either in liquid phase or in vapor phase, and that vapor phase withdrawal may be resorted to by heat exchanging the withdrawn vapor with a colder fluid from the operation so as to liquefy the withdrawn vapor and make possible the imposition of the desired pressure on the withdrawn vapor in liquid phase.

Although several embodiments of the present invention have been disclosed and described herein, it is to be expressly understood that various changes and substitutions may be made therein without departing from the spirit of the invention, as will be understood by those skilled in this art. Reference, therefore, will be had to the appended claims for a definition of the limits of the invention.

What is claimed is:

1. Apparatus for determining the depth of a body of liquid, comprising in combination means for establishing a confined vertically extending column of gas with a liquid-vapor interface between the body of liquid and the gas of the column at the lower end of the column, whereby the pressure of the column of gas is equal to the pressure of the body of liquid at the lower end of the column of gas; means for passing a stream of uncontaminated liquid material in heat exchange relationship with the body of liquid to vaporize at least a portion of the stream; means for continuously introducing the vapor from the stream into the confined column of gas at a location removed from the lower end thereof to cause the column of gas continuously to flow from the location of introduction of the stream vapor to the lower end of the column of gas and to pass from the lower end of the column of gas into the body of liquid; and means for measuring the pressure of the column of gas as an indication of the height to which the body of liquid extends above the lower end of the column of gas.

2. In fractionating apparatus for separating different boiling point components of gaseous mixtures, in which a body of liquid comprising a mixture of at least one relatively low boiling material and at least one relatively high boiling material collects in the apparatus, and in which a body of fluid also collects in the apparatus; means for determining the depth of the body of liquid, which comprises means for establishing a confined vertically extending column of gas with a liquid-vapor interface between the body of liquid and the gas of the column at the lower end of the column, whereby the pressure of the column of gas is equal to the pressure of the body of liquid at the lower end of the column of gas; means for continuously withdrawing fluid from the body of fluid; means for establishing a column of withdrawn fluid in liquid phase and of a height such that the pressure of the column of withdrawn fluid at the bottom thereof is somewhat greater than the pressure of the column of gas; means for continuously passing a sleeve of withdrawn fluid in liquid phase about the column of withdrawn fluid to insulate the column of withdrawn fluid against the entry of ambient heat, thereby to maintain the column of withdrawn fluid in liquid phase; means for continuously removing the fluid in liquid phase from the bottom of the column of withdrawn fluid; means for heating the removed fluid to vaporize at least a portion thereof; means for continuously introducing the vapor from the removed fluid into the confined column of gas at a location removed from the lower end thereof to cause the column of gas continuously to flow from the location of introduction of the vapor from the removed fluid to the lower end of the column of gas and to pass from the lower end of the column of gas into the body of liquid, thereby to avoid accumulation of the relatively high boiling material mixed in the body of liquid, in solid phase in the column of gas; and means for measuring the pressure of the column of gas as an indication of the height to which the body of liquid extends above the lower end of the column of gas.

3. In fractionating apparatus for separating different boiling point components of gaseous mixtures, in which a first body of liquid comprising a mixture of at least one relatively low boiling material and at least one relatively high boiling material collects in the apparatus and in which a second body of liquid also collects in the apparatus; means for determining the depth of the first body of liquid, which comprises in combination means for establishing a confined vertically extending column of gas with a liquid-vapor interface between the first body of liquid and the gas of the column at the lower end of the column, whereby the pressure of the column of gas is equal to the pressure of the first body of liquid at the lower end of the column of gas; means for continuously withdrawing liquid from the second body of liquid; means for establishing a column of withdrawn liquid of a height such that the pressure of the column of liquid at the bottom thereof is somewhat greater than the pressure of the column of gas; means for continuously removing the liquid from the bottom of the column of liquid; means for heating the removed liquid to vaporize at least a portion thereof; means for continuously introducing the vapor from the removed liquid into the confined column of gas at a location removed from the lower end thereof to cause the column of gas continuously to flow from the location of introduction of the vapor from the removed liquid to the lower end of the column of gas and to pass from the lower end of the column of gas into the first body of liquid, thereby to avoid accumulation of the relatively high boiling material mixed in the first body of liquid, in solid phase in the column of gas; and means for measuring the pressure of the column of gas as an indication of the height to which the first body of liquid extends above the lower end of the column of gas.

4. In fractionating apparatus for separating different boiling point components of gaseous mixtures, in which a first body of liquid comprising a mixture of at least one relatively low boiling material and at least one relatively high boiling material collects in the apparatus and in which a second body of liquid collects in the apparatus a substantial distance above the first body of liquid; means for determining the depth of the first body of liquid, which comprises in combination means for establishing a confined vertically extending column of gas with a liquid-vapor interface between the first body of liquid and the gas of the column at the lower end of the column, whereby the pressure of the column of gas is equal to the pressure of the first body of liquid at the lower end of the column of gas; means for continuously withdrawing liquid from the second body of liquid; means for establishing a column of withdrawn liquid of a height such that the pressure of the column of liquid at the bottom thereof is somewhat greater than the pressure of the column of gas; means for continuously removing the liquid from the bottom of the column of liquid; means for passing the removed liquid into heat exchange relationship with the first body of liquid, to vaporize at least a portion of the removed liquid; means for continuously introducing the vapor from the removed liquid into the confined column of gas at a location removed from the lower end thereof, to cause the column of gas continuously to flow from the location of introduction of the vapor from the removed liquid to the lower end of the column of gas and to pass from the lower end of the column of gas into the first body of liquid, thereby to avoid accumulation of the relatively high boiling material mixed in the first body of liquid, in solid phase in the column of gas; and means for measuring the pressure of the column of gas as an indication of the height to which the first body of liquid extends above the lower end of the column of gas.

5. In fractionating apparatus for separating different boiling point components of gaseous mixtures, in which a body of liquid comprising a mixture of at least one relatively low boiling material and at least one relatively high boiling material collects in the apparatus, and in which a body of fluid also collects in the apparatus; means for determining the depth of the body of liquid, which comprises means for establishing a confined vertically extending column of gas with a liquid-vapor interface between the body of liquid and the gas of the column at the lower end of the column, whereby the pressure of the column of gas is equal to the pressure of the body of liquid at the lower end of the column of gas; means for continuously withdrawing fluid from the body of fluid; means for establishing a stream of withdrawn fluid in liquid phase; means for subjecting at least a portion of the stream to a pressure somewhat greater than the pressure of the column of gas; means for heating the stream to vaporize at least a portion thereof; means for continuously introducing the vapor from the stream into the confined column of gas at a location removed from the lower end thereof to cause the column of gas continuously to flow from the location of introduction of the stream vapor to the lower end of the column of gas and to pass from the lower end of the column of gas into the body of liquid; thereby to avoid accumulation of the relatively high boiling material mixed in the body of liquid, in solid phase in the column of gas; and means for measuring the pressure of the column of gas as an indication of the height to which the body of liquid extends above the lower end of the column of gas.

6. In a fractionating apparatus for separating different boiling point components of gaseous mixtures, in which a body of liquid comprising a mixture of at least one relatively low boiling material and at least one relatively high boiling material collects in the apparatus, and in which a body of fluid also collects in the apparatus; means for determining the depth of the body of liquid, which comprises means for establishing a confined vertically extending column of gas with a liquid-vapor interface between the body of liquid and the gas of the column at the lower end of the column, whereby the pressure of the column of gas is equal to the pressure of the body of liquid at the lower end of the column of gas; means for continuously withdrawing fluid from the body of fluid; means for establishing a stream of withdrawn fluid in liquid phase; means for subjecting at least a portion of the stream to a pressure somewhat greater than the pressure of the column of gas; means for passing the stream in heat exchange relationship with the body of liquid to vaporize at least a portion of the stream; means for continuously introducing the vapor from the stream into the confined column of gas at a location removed from the lower end thereof to cause the column of gas continuously to flow from the location of introduction of the stream vapor to the lower end of the column of gas and to pass from the lower end of the column of gas into the body of liquid, thereby to avoid accumulation of the relatively high boiling material mixed in the body of liquid, in solid phase in the column of gas; and means for measuring the pressure of the column of gas as an indication of the height to which the body of liquid extends above the lower end of the column of gas.

7. In fractionating apparatus for separating different boiling point components of gaseous mixtures, in which a body of liquid comprising a mixture of at least one relatively low boiling material and at least one relatively high boiling material collects in the apparatus and in which a body of fluid also collects in the apparatus; means for determining the depth of the body of liquid, which comprises means for establishing a confined vertically extending column of gas with a liquid-vapor interface between the body of liquid and the gas of the column at the lower end of the column, whereby the pressure of the column of gas is equal to the pressure of the body of liquid at the lower end of the column of gas; means for continuously withdrawing fluid from the body of fluid; means for establishing a column of withdrawn fluid in liquid phase of a height such that the pressure of the column of withdrawn fluid at the bottom thereof is somewhat greater than the pressure of the column of gas; means for continuously removing the fluid in liquid phase from the bottom of the column of withdrawn fluid; means for heating the removed fluid to vaporize at least a portion theerof; means for continuously introducing the vapor from the removed fluid into the confined column of gas at a location removed from the lower end thereof to cause the column of gas continuously to flow from the location of introduction of the vapor from the removed fluid to the lower end of the column of gas and to pass from the lower end of the column of gas into the body of liquid, thereby to avoid accumulation of the relatively high boiling material mixed in the body of liquid, in solid phase in the column of gas; and means for measuring the pressure of the column of gas as an indication of the height to which the body of liquid extends above the lower end of the column of gas.

8. In fractionating apparatus for separating different boiling point components of gaseous mixtures, in which a body of liquid comprising a mixture of at least one relatively low boiling material and at least one relatively high boiling material collects in the apparatus and in which a body of fluid also collects in the apparatus; means for determining the depth of the body of liquid, which comprises means for establishing a confined vertically extending column of gas with a liquid-vapor interface between the body of liquid and the gas of the column at the lower end of the column, whereby the pressure of the column of gas is equal to the pressure of the body of liquid at the lower end of the column of gas; means for continuously withdrawing fluid from the body of fluid; means for establishing a column of withdrawn fluid in liquid phase of a height such that the pressure of the column of withdrawn fluid at the bottom thereof is somewhat greater than the pressure of the column of gas; means for continuously removing the fluid in liquid phase from the bottom of the column of withdrawn fluid; means for passing the removed liquid in heat exchange relationship with the body of liquid, to vaporize at least a portion of the removed liquid; means for continuously introducing the vapor from the removed fluid into the confined column of gas at a location removed from the lower end thereof to cause the column of gas continuously to flow from the location of introduction of the vapor from the removed fluid to the lower end of the column of gas and to pass from the lower end of the column of gas into the body of liquid, thereby to avoid accumulation of the relatively high boiling material mixed in the body of liquid, in solid phase in the column of gas; and means for measuring the pressure of the column of gas as an indication of the height to which the body of liquid extends above the lower end of the column of gas.

9. In fractionating apparatus for separating different boiling point components of gaseous mixtures, in which a body of liquid comprising a mixture of at least one relatively low boiling material and at least one relatively high boiling material collects in the apparatus and in which a body of vapor also collects in the apparatus; means for determining the depth of the body of liquid, which comprises means for establishing a confined vertically extending column of gas with a liquid-vapor interface between the body of liquid and the gas of the column at the lower end of the column, whereby the pressure of the column of gas is equal to the pressure of the body of liquid at the lower end of the column of gas; means for continuously withdrawing vapor from the body of vapor; means for establishing a column of withdrawn vapor in liquid phase of a height such that the pressure of the column of liquid phase at the bottom thereof is somewhat greater than the pressure of the column of gas; means for continuously removing the liquid from the bottom of the column of liquid phase; means for heating the removed liquid to vaporize at least a portion thereof; means for continuously introducing the vapor from the removed liquid into the confined column of gas at a location removed from the lower end thereof to cause the column of gas continuously to flow from the location of introduction of the vapor from the removed liquid to the lower end of the column of gas and to pass from the lower end of the column of gas into the body of liquid, thereby to avoid accumulation of the relatively high boiling material mixed in the body of liquid, in solid phase in the column of gas; and means for measuring the pressure of the column of gas as an indication of the height to which the body of liquid extends above the lower end of the column of gas.

10. In fractionating apparatus for separating different boiling point components of gaseous mixtures, in which a body of liquid comprising a mixture of at least one relatively low boiling material and at least one relatively high boiling material collects in the apparatus and in which a body of vapor also collects in the apparatus; means for determining the depth of the body of liquid, which comprises means for establishing a confined vertically extending column of gas with a liquid-vapor interface between the body of liquid and the gas of the column at the lower end of the column, whereby the pressure of the column of gas is equal to the pressure of the body of liquid at the lower end of the column of gas; means for continuously withdrawing vapor from the body of vapor; means for establishing a column of withdrawn vapor in liquid phase of a height such that the pressure of the column of liquid phase at the bottom thereof is somewhat greater than the pressure of the column of gas; means for continuously removing the liquid from the bottom of the column of liquid phase; means for passing the removed liquid in heat exchange relationship with the body of liquid, to vaporize at least a portion of the removed liquid; means for continuously introducing the vapor from the removed liquid into the confined column of gas at a location removed from the lower end thereof to cause the column of gas continuously to flow from the location of introduction of the vapor from the removed liquid to the lower end of the column of gas and to pass from the lower end of the column of gas into the body of liquid, thereby to avoid accumulation of the relatively high boiling material mixed in the body of liquid, in solid phase in the column of gas; and means for measuring the pressure of the column of gas as an indication of the height to which the body of liquid extends above the lower end of the column of gas.

References Cited in the file of this patent

UNITED STATES PATENTS

| | | |
|---|---|---|
| 1,927,758 | Scheel et al. | Sept. 19, 1933 |
| 2,326,511 | Zenner | Aug. 10, 1943 |
| 2,438,330 | Winton | Mar. 23, 1948 |
| 2,542,168 | Voleau | Feb. 20, 1951 |

UNITED STATES PATENT OFFICE
CERTIFICATION OF CORRECTION

March 15, 1960

Patent No. 2,928,278

Clarence J. Schilling

It is hereby certified that error appears in the above numbered patent requiring correction and that the said Letters Patent should read as corrected below.

Column 6, line 23, after "pass" insert -- from --; column 9, line 4, after "In" strike out -- a --.

Signed and sealed this 23rd day of May 1961.

(SEAL)
Attest:

ERNEST W. SWIDER
Attesting Officer

DAVID L. LADD
Commissioner of Patents